US010718460B2

(12) United States Patent
Sorensen

(10) Patent No.: US 10,718,460 B2
(45) Date of Patent: Jul. 21, 2020

(54) PLUG FOR PLUGGING A LINE AND A METHOD FOR INSTALLING A PLUG IN A LINE

(71) Applicant: QUALITY INTERVENTION TECHNOLOGY AS, Balestrand (NO)

(72) Inventor: Bjorn Bro Sorensen, Notteroy (NO)

(73) Assignee: Quality Intervention Technology AS, Balestrand (NO)

( * ) Notice: Subject to any disclaimer, the term of this patent is extended or adjusted under 35 U.S.C. 154(b) by 15 days.

(21) Appl. No.: 16/071,852

(22) PCT Filed: Jan. 25, 2017

(86) PCT No.: PCT/EP2017/051570
§ 371 (c)(1),
(2) Date: Jul. 20, 2018

(87) PCT Pub. No.: WO2017/129631
PCT Pub. Date: Aug. 3, 2017

(65) Prior Publication Data
US 2019/0056053 A1 Feb. 21, 2019

(30) Foreign Application Priority Data
Jan. 25, 2016 (GB) .................................. 1601324.5

(51) Int. Cl.
*F16L 55/136* (2006.01)
(52) U.S. Cl.
CPC ................... *F16L 55/136* (2013.01)
(58) Field of Classification Search
CPC .................................................... F16L 55/136
(Continued)

(56) References Cited

U.S. PATENT DOCUMENTS 2,374,947 A 5/1945 Nicholson
2,607,370 A * 8/1952 Anderson ............. F16L 55/136
138/90

(Continued)

FOREIGN PATENT DOCUMENTS

| GB | 956 196 A | 4/1964 |
| GB | 2 081 838 A | 2/1982 |
| GB | 2 439 880 A | 1/2008 |
| WO | WO 2006/127449 A2 | 11/2006 |

OTHER PUBLICATIONS

International Search Report and Written Opinion of International Application No. PCT/EP2017/051570 dated Apr. 5, 2017, 14 pages.
(Continued)

*Primary Examiner* — Craig M Schneider
*Assistant Examiner* — David R Deal
(74) *Attorney, Agent, or Firm* — Fay Sharpe LLP

(57) ABSTRACT

A plug for plugging a line includes a seal, a first end assembly and a second end assembly. The first end assembly includes a gripping member. An actuator is configured to draw the first and second end assemblies together when there is a relative motion between the actuator and the first end assembly. The actuator is configured to actuate the gripping member. An initial part of a motion of the actuator actuates the gripping member to grip an inner surface of the line, thus inhibiting a motion of the first end assembly, and a subsequent part of the motion of the actuator, relative to the thus motion-inhibited first end assembly, draws the second end assembly toward the first end assembly so as to compress the seal such that the seal may seal against the inner surface of the line thus plugging the line.

17 Claims, 7 Drawing Sheets

(58) Field of Classification Search
USPC .............................................. 138/89, 90, 93
See application file for complete search history.

(56) References Cited

U.S. PATENT DOCUMENTS

| | | | | |
|---|---|---|---|---|
| 2,870,794 | A * | 1/1959 | Thaxton | F16L 55/136 138/90 |
| 2,974,685 | A * | 3/1961 | Ver Nooy | F16L 55/136 138/90 |
| 4,760,868 | A | 8/1988 | Saxon | |
| 4,817,671 | A * | 4/1989 | Mathison | F16L 55/132 138/89 |
| 5,293,905 | A | 3/1994 | Friedrich | |
| 5,797,431 | A | 8/1998 | Adams | |
| 8,333,219 | B2 * | 12/2012 | Holstad | F16L 55/136 138/90 |
| 9,400,076 | B2 * | 7/2016 | Early | F16L 55/128 |
| 2005/0241710 | A1 * | 11/2005 | Early | F16L 55/1283 138/89 |
| 2010/0051130 | A1 * | 3/2010 | Syse | F16L 55/136 138/89 |
| 2011/0278022 | A1 * | 11/2011 | Holstad | F16L 55/136 166/386 |

OTHER PUBLICATIONS

UK Search Report of British Application No. 1601324.5 dated Jun. 29, 2016, 3 pages.

* cited by examiner

PLUG FOR PLUGGING A LINE AND A
METHOD FOR INSTALLING A PLUG IN A
LINE

BACKGROUND

The present invention provides a plug for plugging a line and a method for installing a plug in a line.

It is desirable to plug a line for numerous reasons. For instance, if work—such as welding—needs to be carried out on a line, a section may need to be isolated from the other sections of the line (which may be pressurised). Further, a plug may simply be used to seal off a line temporarily.

However, due to the shape of the line, it can be difficult to install such a plug. For instance, it is typically only possible to access one side of a plug (the near side to the user) when installing the plug as the far side of the plug is prevented from being accessed by the installer due to the line and the plug itself being in the way.

One prior art solution is shown schematically in FIGS. 12 and 13. This plug 201 allows the user to install it by accessing only one side of the plug 201 (the left hand side in FIGS. 12 and 13). The plug 201 comprises a first end assembly 210 and a second end assembly 240. Between the first and second end assemblies is a seal 202. The first end assembly 210 comprises a gripping member 216 between two gripping member actuators 270 and 270'. The gripping member 216 is deformable such that when the gripping member actuators 270 and 270' are moved toward each other, the radius of the gripping member expands (as can be seen in FIG. 13). The seal 202 is deformable such that when the first end assembly 210 and the second end assembly 240 are brought towards each other the radius of the seal expands (as can be seen in FIG. 13). The gripping member actuators 270, 270' and the second end assembly 240 are made from metal.

The second end assembly 240 is rigidly connected to a threaded axial shaft 280 that passes through the plug 201 to the second end assembly. The first end assembly 210 is slidably mounted on the shaft 280 and is contacted by threaded nut 290, which is threaded onto the shaft 280.

In order for the plug 201 to plug a line, it is necessary for it to be inserted into the line in a relaxed state (the state shown in FIG. 12). It is then necessary to expand the seal 202 and the gripping member 216 radially. This is done by rotating the nut 290 whilst holding the shaft 280 stationary. As can be appreciated, this will bring the gripping member actuator 270 toward gripping member actuator 270' and will bring the first end assembly 210 toward to the second end assembly 240. This causes the gripping member 216 and the seal 202 to expand simultaneously. Thus, the gripping member 216 can grip the inside of a line and the seal 202 can seal against the inside of the line.

Examples of plugs similar to that shown in FIGS. 12 and 13 have been developed by IK (the HP Plug) and by iNPIPE PRODUCTS (the High Pressure Pipe Plug).

However, the plug of FIGS. 12 and 13 is not an optimal solution for plugging a line. As can be appreciated, the prior art plug 201 requires the installer to apply a torque to one component (such as the nut 290) whilst the installer also holds another component against rotation (such as the shaft 280). Doing so requires special tools and techniques, and increases the complexity of the plug itself. It is therefore desirable to produce a simpler plug, which is easier to install.

BRIEF SUMMARY

In one aspect the invention provides a plug for plugging a line, the plug comprising: a seal; a first end assembly located at a first end of the seal and a second end assembly located at an opposite second end of the seal, the first end assembly comprising at least one gripping member that is configured to grip an inner surface of the line; and an actuator configured to draw the first and second end assemblies together when there is a relative motion between the actuator and the first end assembly, characterised in that: the actuator is configured to actuate the gripping member, and the plug is arranged such that: an initial part of a motion of the actuator actuates the gripping member to grip the inner surface of the line, thus inhibiting motion of the first end assembly, and a subsequent part of the motion of the actuator, relative to the thus motion-inhibited first end assembly, draws the second end assembly toward the first end assembly so as to compress the seal such that the seal may seal against the inner surface of the line thus plugging the line.

This plug, in comparison to the prior art plugs discussed above, allows for simpler installation of the plug within the line. In the prior art, as mentioned above, it is necessary for the user to hold the second end assembly stationary (e.g. via shaft 280) whilst moving the actuator (nut 290) in order for the actuator (nut 290) to move the first and second end assemblies (210, 240) toward each other, and hence compress the seal (202). The present plug does not require the user to hold the first end assembly stationary. Rather, it is the initial movement of the actuator that causes the gripping member to hold the first end assembly against the inner surface of the line.

Given the locations in which such plugs are typically used (e.g. inside pipes or lines), in order for the user to hold the first end assembly relative to the actuator, the prior art plugs have a complex design. This complex design in the prior art arises from the fact that in the prior art it is necessary for the installer to have control over end assemblies on both sides of the seal, so as to actively control the relative movement of the first and second end assemblies, from one side of the plug.

In contrast, the present plug is much simpler, since there is no need for the user to have access to both end assemblies. Due to this more simple design (e.g. since there is no need to be able to hold the first end assembly), the present plug can have a significantly shorter length than the plugs in the prior art.

Further, given that, in the prior art plugs, the second end assembly must be held (via shaft 280) and the actuator must be actuated from the same side of the plug (via nut 290), complex and specialised installation tools need to be used (e.g. with concentric tool heads—one for holding the first end assembly and one for moving the actuator). Indeed, these tools may not be suitable for use in a pressurised environment, i.e. they do not provide, during installation, a sealed environment in the vicinity of the plug; this would allow pressurised fluid in the line in the vicinity of the plug to leak out of the line via the tool.

In contrast, the present plug does not require any such specialist installation tool, or at least merely requires a much a simpler tool. The present plug can be installed by only contacting the actuator (i.e. there is no need for a user/tool to have any controlling contact with both end assemblies, unlike the prior art). Further, the present plug can be installed using one motion applied to the actuator only—the first part of which causes the first end assembly to be held relative to the line and the second part of which cause relative motion between the actuator and the first end assembly. Thus, the tool/user need only be able to contact one element (the actuator) and need only be capable of producing one form of motion. This is much simpler than for the prior art plug. Due to this simpler tool, the present plug may be installed in a pressurised line (such as a lateral side line pipe in a well leading to an annulus); whereas the prior art plugs may not be used in a pressurised environment since, as is mentioned above, the complex tools typically needed to install the prior art plug are not suitable for use in a pressurised environment.

Further, in the prior art, the compression of the gripping member 216 and the seal 202 occurs simultaneously. This is fundamentally different to the present invention, where the gripping member is actuated prior to the substantial compression of the seal, i.e. it is effectively a two stage process. Thus, the plug may be held in place by the gripping member prior to the seal forming.

The plug, the seal, the first end assembly and/or the second end assembly may generally be cylindrical. The first and/or second end assembly may comprise a plate, preferably of circular cross-section that contacts the seal. Alternatively, the first and/or second end assembly may comprise a tapered/conical/frusto-conical portion that extends into the seal, such as those shown in FIGS. 12 and 13.

Further, in the prior art, the gripping member (216) is used to maintain the axial position of the plug relative to the line (e.g. against pressure forces) and the seal (202) is used to provide a seal. The gripping member (216) is not used to provide a seal and the seal (202) is not used to maintain the axial position of the plug.

In contrast, the seal of the present invention is configured to both maintain the axial position of the plug and to seal against the line. This may be achieved by having a longer seal. Also in contrast to the prior art, the gripping member of the present plug may have a different purpose: it may merely be used to stop relative motion of the actuator and the first end assembly—it may not provide any significant forces for maintaining axial positioning of the plug.

The plug may have a longitudinal direction, which is defined as the direction separating the first and second ends of the seal (the first end of the seal being the end adjacent the first end assembly and the second end of the seal being the end adjacent the second end assembly). The above cylinders, plates and cones may have their axis of rotational symmetry about the longitudinal direction.

The seal may comprise a resilient material, such as polyurethane. The material of the seal may preferably be compatible with chemicals inside the line pipe. Typically, the seal has a Shore hardness of at least 10, 20 30 or 40. As the first and second end assemblies are drawn together, the seal may be compressed in the longitudinal direction and may expand perpendicularly to the longitudinal direction (e.g. radially, when the seal is a cylinder).

The first and/or second end assembly may preferably directly contact the seal, but there may also be other elements inbetween the seal and the assembly.

In the present plug, the same actuator moves the two end assemblies relative to each other and actuates the gripping device. The same motion (i.e. motion in the same direction at least) of the actuator relative to the first assembly both engages the gripping device and draws the two end assemblies toward each other. However, the mechanism by which the actuator draws the two end assemblies together may be different to the mechanism that actuates the gripping device, as is discussed in more detail below.

In the present plug, the initial part of the actuator motion causes the gripping member to be actuated. This may or may not be the very first part of the movement of actuator; rather, what is meant here is that it is the movement of the actuator that causes the gripping of the first end assembly prior to, preferably immediately prior to, the movement that causes the second end assembly to be drawn toward the first end assembly. The subsequent part of the motion may start as soon as the motion of the first end assembly is inhibited.

The motion of the actuator may preferably be continuous between the initial part of the motion and the subsequent part of the motion. The motion may also be discontinuous.

The motion is preferably in the same direction. However, the speed may be constant or may vary.

There may also be some relative movement between the actuator and the remainder of the first end assembly (i.e. the first end assembly excluding the gripping member) during the initial part of the actuator movement. Thus, the first and second end assemblies may also be drawn together during the initial movement. However, this effect may be quite small, and most of the drawing together may occur during the subsequent motion (when the first end assembly is inhibited).

Further, it is possible that the first end assembly may slip relative to the line during the subsequent motion. During such a time, the motion of the actuator may then again act to actuate the gripping member.

When the gripping member is actuated, the motion of the first end assembly is inhibited. Because the first end assembly may be connected to the actuator, and since there may be some friction present between actuator and the first end assembly, when the actuator moves the first end assembly may tend to move with the actuator. This motion of the first end assembly is undesirable since the present plug requires relative motion of the first end assembly and the actuator in order for the first end assembly and the second end assembly to be drawn together. It is this issue that the gripping member seeks to overcome. This solution is different to the prior art solutions, where to address this issue the first end assembly must be held by the user/installation tool.

The motion of the first end assembly may be partially inhibited (i.e. slowed relative to that of the actuator) or completely inhibited (i.e. held fast against the inner surface of the line).

The grip offered by the gripping means may only be needed to start the process of compressing the seal. Once the seal has begun to compress, the motion of the first end assembly may be inhibited relative to the motion of the actuator due to friction between the first end assembly and the seal.

The line may be a pipe or other similar conduit, preferably a side bore or lateral side line pipe to a well or well head. The line may have a substantially circular cross-section, and may be elongated in the general direction of the axial direction of the circle. The lateral side line pipe may be a generally horizontal line. The line may lead to an annulus within the well. The line may be at substantially the same pressure as the annulus. The plug may be installed so as to seal the annulus from an outer portion of the line pipe, which may be open to atmospheric pressure, or at least a lower pressure than the annulus. This may allow the outer portion of the line pipe (and any other components outside of the plug) to be worked on at atmospheric pressure, or indeed removed, whilst maintaining the pressure and fluids in the annulus.

The first end and first end assembly may be the end distant from the user/tool. This is different to the prior art, where the first end assembly (i.e. the end assembly with the gripping member) is the end assembly nearer the user/tool.

The first end assembly (when viewed along the longitudinal direction) may have a rotational symmetry, such as a 180° rotational symmetry. The plug, seal, actuator, and/or second end assembly may have a rotational symmetry, such as a 180° rotational symmetry.

The second end assembly may be one integral piece, or may comprise multiple pieces.

The motion may be a first motion, such as a motion in a first direction. The plug may be arranged such that: a second motion of the actuator moves the first and second end assemblies away from each other so as to decompress the seal, and the second motion of the actuator causes the gripping member to release the inner surface of the line.

This may be done in any order, but preferably the plug may be configured such that an initial part of the second motion causes the movement of the first and second end assemblies away from each other. A subsequent part of the second motion may then cause the gripping means to release the inner surface of the line. The subsequent second motion may also cause some small movement of the first and second end assemblies away from each other.

The same second motion (i.e. motion in the same second direction) of the actuator disengages the gripping device and moves the two end assemblies away each other. However, the mechanism by which the actuator moves the two end assemblies apart may be different to the mechanism that disengages the gripping device, as is discussed in more detail below. Further, the mechanism by which the actuator moves the two end assemblies apart may be the same mechanism that draws the two end assemblies together, and the mechanism that disengages the gripping device may be the same mechanism that engages the gripping device, but just operated using a second motion different to the first motion.

The second motion of the actuator may preferably be continuous between the initial part of the motion and the subsequent part of the motion. The motion may also be discontinuous.

The initial and subsequent second motions are preferably in the same direction. However, the speed maybe constant or may vary.

There may also be some relative movement between the actuator and the first end assembly during the subsequent part of the actuator second motion. Thus, the first and second end assemblies may also be moved apart during the subsequent movement. However, this effect may be quite small, and most of the drawing together may occur during the subsequent motion (when the first end assembly is inhibited).

The first motion and the second motion may be in different directions, preferably opposite directions.

The motion may be a rotation. The first motion may be a rotation and the second motion may be a rotation. The first and second rotations may be in opposite directions. Preferably, the first rotation direction of the actuator (i.e. the direction the user/tool turns the actuator) is clockwise (with respect to the user/tool's view) and the second direction is anti-clockwise. Although, of course, this could be the other way around.

Thus, the plug may arranged such that: an initial part of a rotation of the actuator actuates the gripping member to grip the inner surface of the line, thus inhibiting motion of the first end assembly, and a subsequent part of the rotation of the actuator, relative to the thus motion-inhibited first end assembly, draws the second end assembly toward the first end assembly in a longitudinal direction so as to compress the seal such that the seal may seal against the inner surface of the line thus plugging the line The gripping member may be pivotable between its gripping position and its non-gripping position. The gripping member may be pivotable relative to the remainder of the first end portion. Preferably, the pivot is about a longitudinal axis, relative to the plug. Preferably, the pivot is located around a midpoint of the gripping member.

Alternatively/additionally, the gripping member may be slidable between its gripping position and its non-gripping position. The gripping member may be slidable relative to the remainder of the first end portion. Preferably, the slide is perpendicular to the longitudinal axis, relative to the plug, and preferably in the plane of the first end assembly. Preferably, the slide is in a radial direction, taken from the central longitudinal axis (e.g. the axis of rotationally symmetry) of the plug/first end assembly. The first end assembly may comprise a means for retaining the gripping member to the remainder of the first end assembly. This means may comprise a guide that extends in the direction of sliding, preferably two such guides, preferably along a segment of the circle defined by the periphery of the plug. There are preferably two such guides extending parallel with one another, and holding the gripping member inbetween. The gripping member may have an edge portion extending parallel with the guide(s), preferably at each end of the gripping member. These edge portion(s) may be configured to cooperate with the guide(s) to allow the gripping member to slide relative to and along the guide(s) and to retain the gripping member adjacent the first end assembly. The guide and the gripping member may be configured to allow the gripping member to slide along the guide.

When in the non-engaged, non-actuated position, the gripping member preferably does not (significantly) protrude beyond the periphery of the plug (when viewed from along the longitudinal axis of the plug). When in the engaged, actuated position, the gripping member preferably protrudes beyond the periphery of the plug (when viewed from along the longitudinal axis of the plug), preferably between 1-10 mm, preferably 2-6 mm. This allows the plug to be inserted into the line without the gripping member inhibiting the insertion of the plug, but also allows the gripping member to engage with the inner surface of the line.

The gripping member may comprise a generally elongated portion, such as a crescent. When in the non-actuated position, the outer portion/edge/surface of the crescent-shape may substantially follow a portion of the outer periphery of the plug/first end member, although it is preferably marginally inward of the outer periphery.

When in the actuated position, the elongated portion may have been pivoted such that a first end of the gripping member may extend beyond the periphery of the plug (when viewed from along the longitudinal axis of the plug). At this time (and when the pivot is around the midpoint of the gripping member), the second opposite end of the gripping member may be located more centrally with respect to the plug than in its non-actuated position.

The gripping member may comprise a gripping surface. The gripping surfaces may be located at the positions at which the gripping member contacts the line. This may preferably be located at the first and/or second end of the gripping member, and may preferably located on the outer portion/surface of the gripping member (i.e. the portion adjacent the outer periphery of the plug when view along the longitudinal axis of the plug).

The gripping surface may comprise grooves and ridges. The grooves and ridges may run in the longitudinal direction and/or in the peripheral direction (e.g. the circumferential direction). The gripping surface may comprise a high friction surface material. The gripping surface may provide sufficient friction to prevent the gripping member to slide against the inner surface of the line.

The gripping member comprises a B-shape. The outer portion/edge/surface of the B-shape (with respect to the central longitudinal axis of the plug) may be the curved side of the B, such that there are two bulges on the outer portion/edge/surface of the gripping member. It may be these bulges that engage the inner surface of the line. The B-shape may be preferable for the sliding gripping member embodiment. However, the sliding gripping member can take other shapes (such as crescent-shaped, part circular-shaped, or rectangular).

Regarding the sliding gripping member, when in the actuated position, the gripping member may have been slid such that a portion of the gripping member, such as a first end and a second end (which may define the bulges of the B, when the gripping member is B-shaped) of the gripping member, may extend beyond the periphery of the plug (when viewed from along the longitudinal axis of the plug). Thus there may be two points of contact between the gripping member and the inner surface of the line. When in its non-actuated position, the first and second ends (and indeed the whole of the gripping member) may be within the outer periphery of the plug.

The gripping member may comprise at least one gripping surface. The gripping surfaces may be located at the positions at which the gripping member contacts the line. This may preferably be located at the first and/or second end, and may preferably located on the outer portion/surface of the gripping member (i.e. the portion adjacent the outer periphery of the plug when view along the longitudinal axis of the plug). The gripping surface may comprise grooves and ridges. The grooves and ridges may run in the longitudinal direction and/or in the peripheral direction (e.g. the circumferential direction). The gripping surface may comprise a high friction surface material. The gripping surface may provide sufficient friction to prevent the gripping member to slide against the inner surface of the line.

The gripping member may be substantially incompressible. The gripping member may be substantially inelastic. The gripping member may consist of metal. In the prior art, the gripping member (216 in FIGS. 12 and 13)) is required to compress and expand as the plug is actuated. Unlike the prior art, the present invention need not have such a gripping member. Rather the gripping member can be made of a more durable material (such as a nickel-chrome alloy or tungsten or a tungsten alloy or tungsten carbide or hi-tensile steel) that will not fatigue and will cause greater friction against the inner surface of the line.

The gripping member may be configured such that, when it is actuated to grip the inner surface of the line, it acts to inhibit movement of the plug in the axial and/or circumferential direction of the line. Thus, it may or may not solely be the compressed seal that prevents the plug from moving when exposed to differential pressures in the axial direction.

The first end assembly may preferably comprise at least one stop. The stop and the gripping member may be arranged so that the stop limits the movement of the gripping member, either via direct contact or via contact with the actuator (see below). Thus, the stop may limit movement of the gripping member relative to the remainder of the first assembly. Preferably the stop limits movement of the gripping member caused by the actuator in the second motion direction. Preferably, the stop does not limit movement of the gripping member caused by the actuator in the first motion direction.

The gripping member may (preferably when pivotable) comprise a channel through which the stop is configured to pass. The gripping member and the stop may be arranged such that the stop abuts the end of the channel, thus limiting the movement of the gripping member, when the gripping member is in the desired position (which may preferably be the "non-actuated position" discussed above).

The gripping member (preferably when slidable) may be attached to a resilient member configured to urge the gripping member into the non-gripping position.

The first end assembly may comprise a plurality of gripping members. Preferably there are at least two, preferably only two. The gripping members may each have any of the features discussed in this specification. Each of the gripping members may be substantially identical.

Preferably, the plurality of gripping members are arranged in a symmetric fashion, preferably with a rotational symmetry about the central longitudinal axis of the plug. For instance, when two gripping members are present, there may be a 180° rotational symmetry in their arrangement, preferably both in the actuated and non-actuated positions.

The actuator may comprise an elongated member that passes through the seal and the first end assembly. Preferably, the elongated member is cylindrical. Preferably, it extends in the longitudinal direction. The elongated member may comprise threads that engage threads on the first end assembly (e.g. threads in a central bore of the first end assembly). It may be these threads that cause the first and second end assemblies to be drawn together, when there is relative motion (rotation) between the first end assembly and the actuator. The threads may or may not extend along substantially the entirety of the elongated member. Thus, rotation of the actuator relative to the first end assembly may cause longitudinal movement of the first end assembly relative to the actuator and/or second end assembly.

The first end assembly, the second end assembly and/or the seal may comprise a bore through which the elongated portion may pass. This bore may preferably be along the central axis (e.g. the axis of rotational symmetry of the plug). The bore of the first end assembly may be threaded.

A stop may be attached to the elongate member to prevent the elongate member being withdrawn entirely from the first end assembly. Preferably, the stop is provided on the end of the elongate member proximate the first end assembly.

The other end of the actuator may abut/engage the second end assembly, or may form part of the second end assembly, or may form an integral part of the second assembly.

Unlike the first end assembly, the second end assembly may preferably be configured such that relative motion between the second end assembly and the actuator does not cause a secondary motion of the second assembly relative to the actuator. For example, rotation of the actuator relative to the second end assembly may not cause longitudinal movement of the second end assembly relative to the actuator. For instance, the bore of the second end assembly may not comprise threads.

Alternatively, there may be no relative motion at all between the second end assembly and the actuator (e.g. either rotational or longitudinal motion). This may be the case when the second end assembly is fixed to the actuator, or the actuator and second end assembly form one integral piece, or if the second end assembly and the actuator are otherwise held relative to one another. In this case, the second end assembly may rotate with the actuator.

It is therefore preferable that the second end assembly and the actuator do not move relative to each other in the longitudinal direction when the first and second assemblies are drawn towards each other (and moved away from each other).

The threaded elongated member may be a bolt. Advantageously, the threaded elongated member may be easily replaceable within the plug, so that different lengths of elongate members can be used for different lengths of seals, which can be selected as appropriate for a given purpose. The length of the elongate member (and the corresponding length of seal) may at least partially define the overall length of the plug. The simple design of the plug may allow for the overall length of the plug to be adjusted by straightforwardly by replacing the elongate member (and the seal) with another elongate member (and seal) of different length.

Preferably, the actuator may be configured such that the motion of the actuator actuates the gripping member directly. This may mean that there is no intermediate component between the actuator and the gripping member, said intermediate component translating the motion of the actuator into a different motion that then actuates the gripping member, i.e. there may be no intermediate component between the actuator and the gripping member that is moved by the actuator with a different form of motion compared to the motion of the actuator and which in turn actuates the gripping member. For instance, in the prior art, the motion of the actuator 280, 290 (a rotation) causes a different motion (a linear motion) of an intermediate component 270, 270' which in turn causes the gripping member 216 to be actuated. The fact that the actuator 280, 290 moves an intermediate component 270, 270' in a different motion (e.g. linear) compared to the motion of the actuator 280, 290 (e.g. rotational), and that said different motion of the intermediate component 270, 270' actuates the gripping member 216, demonstrates that the gripping member 216 is not directly actuated by the actuator 280, 290 in the prior art.

Stated differently, the motion of the actuator may be directly transferred to motion of the gripping member. This may be because the actuator may contact the gripping member directly, such that the motion of the actuator is directly transferred to motion of the gripping member. However, there may, of course, be some minor intermediate components between the actuator and the gripping member (indeed such minor components could well just be considered to be part of the actuator). What is important is that the motion of the actuator may be directly transferred to the gripping member (i.e. there may be no intermediate component actuated by the actuator that has a different motion to the actuator (such a component could not be described as the actuator, or part of the actuator), which in turn actuates the gripping member).

It may be the rotary movement of the actuator that directly actuates the gripping member. There may be no intermediate movement (such as a linear movement, e.g. of an intermediate component) between the rotation of the actuator and the movement of the gripping member caused by the rotation of the actuator. Between the gripping member and the movement input by a user/tool to the present plug to actuate the gripping member, there may be no linear movement. Of course, as discussed below, the gripping member may slide, which is a linear movement, but there still may be no linear movement in the gripping member's actuation mechanism (i.e. the mechanism that transmits user/tool input movement to the gripping member).

Having the actuator directly actuate the gripping member simplifies the present plug. Some ways this direct actuator of the gripping member may be achieved are set out below.

The actuator may comprise a gripping member-contacting portion that is located adjacent the gripping member. The gripping member-contacting portion may be mounted onto the elongated portion. For instance, the gripping member-contacting portion may be a nut that is threaded onto the elongated portion. The gripping member-contacting portion may be adjacent to, preferably in contact with, the first end assembly. The gripping member-contacting portion may be inward of the gripping member, when viewed along the longitudinal axis.

The plug may be configured such that motion (e.g. rotation) of the actuator as a whole causes motion (e.g. rotation) of the gripping member-contacting portion (i.e. the gripping member-contacting portion moves (e.g. rotates) with the remainder of the actuator), which in turn causes the gripping member to be actuated. The movement (e.g. rotation) of the gripping member-contacting portion may directly cause the gripping member to be actuated. The gripping member-contacting portion may directly contact the gripping member when actuating the gripping member.

The gripping member-contacting portion may be configured to move with the (or each) gripping member relative to the first end assembly during the initial (first) motion of the actuator. During this motion, the gripping member-contacting portion may actuate the (or each) gripping member from its non-gripping state to its gripping state. The gripping member-contact portion may act against the urging force of the resilient member(s), when present.

The gripping member-contacting portion may be configured to move the (or each) gripping member relative to the first end assembly during the (subsequent) second motion of the actuator. During this motion, the gripping member-contacting portion may actuate the (or each) gripping member from its gripping state to its non-gripping state, and/or may allow the gripping member-contacting portion to return to its non-gripping state under the urging force of the resilient member(s), when present.

The gripping member-contacting portion may move with the remainder of the actuator due to a friction force holding the gripping member-contacting portion relative to the remainder of the actuator. This friction force may be provided by the threads between the gripping member-contacting portion and the elongated portion of the actuator and/or by contact of the stop on the end of the elongated portion of the actuator with the gripping member-contacting portion.

Once the gripping member-contacting portion (moving in the first motion direction) contacts the gripping member, continued movement of the actuator may move the gripping member into its gripping position. When the gripping member contacts the inner surface of the line, the motion of the gripping member may be stopped. This in turn may stop movement of the gripping member-contacting portion. If the remainder of the actuator is continued to be moved (in the first direction, e.g. the subsequent motion), the remainder of actuator may move relative to the stopped gripping member-contacting portion.

When the motion is rotation, having a threaded contact between the gripping member-contacting portion and the remainder of the actuator may allow for both the initial movement of the gripping member-contacting portion with the remainder of the actuator (via friction in the threads, though this may also/additionally be achieved by friction contact between the stop and the gripping member-contacting portion) and the latter relative movement between the gripping member-contacting portion and the remainder of the actuator.

If the actuator is moved in the other direction (e.g. the second direction), the remainder of the actuator may initially move relative to the gripping member-contacting portion (i.e. the gripping member-contacting portion may remain in its actuated position, contacting the gripping member in its gripping position). This initial motion may last until the seal has substantially completely been released from compression, which may be when the stop of the elongated portion of the actuator contacts the gripping member-contacting portion.

Subsequent second motion may cause the gripping member-contacting portion to move with the remainder of the actuator, thus ceasing to contact the gripping member. Continued motion of the actuator may then cause the gripping member-contacting portion to contact the gripping member in a different location or in a different manner. This different contact may, with continued movement of the actuator in the second direction, move the gripping member into its non-gripping position. When the gripping member contacts the stop of the first end assembly (mentioned above), the motion of the gripping member may be stopped. This in turn may stop movement of the gripping member-contacting portion. This is preferably the case when the gripping member is pivotable and no resilient member is present.

Alternatively/additionally, subsequent second motion may cause the gripping member-contacting portion to move with the remainder of the actuator, thus allowing the resilient member to move the gripping member toward its non-actuated position. With continued second motion, the gripping member-contacting portion may contact the stop, thus stopping its motion, and stopping the motion of the gripping member (at its non-actuated position). This is preferably the case when the gripping member is slidable and the resilient member is present.

When the motion is rotation, having a threaded contact between the gripping member-contacting portion and the remainder of the actuator may allow for both the initial relative movement between the gripping member-contacting portion and the remainder of the actuator and the latter movement of the gripping member-contacting portion with the remainder of the actuator (via friction in the threads, though this may also/additionally be achieved by friction contact between the stop and the gripping member-contacting portion).

Preferably, the gripping member-contacting portion may be an elongated portion, the elongated portion being elongated in a direction perpendicular to the longitudinal axis of the plug. The plug may be configured such that that motion of the actuator causes a rotation of the elongated portion that causes the gripping member to be actuated.

The motion of the gripping member-contacting portion may cause the pivoting of the gripping member. When the gripping member-contacting portion is elongated, during the motion of the gripping member-contacting portion (in the first motion direction) a first end of the gripping member-contacting portion contacts the gripping member at a first position away from the pivot such that further movement of the gripping member-contacting portion causes pivoting around the pivot. During the motion of the gripping member-contacting portion in the second motion direction a second end of the gripping member-contacting portion may contact (or may already be in contact with) the gripping member at a second position away from the pivot such that movement of the gripping member-contacting portion in the second direction causes pivoting in an opposite direction around the pivot.

The motion of the gripping member-contacting portion may cause the sliding of the gripping member. When the gripping member-contacting portion is elongated, during the motion of the gripping member-contacting portion (in the first motion direction) a first end of the gripping member-contacting portion contacts the gripping member such that further movement of the gripping member-contacting portion causes sliding of the gripping member. During the motion of the gripping member-contacting portion in the second motion direction a second end of the gripping member-contacting portion may be in contact with the gripping member. As the gripping member-contacting portion turns in the second motion direction, this allows the gripping member, which may preferably be biased toward the non-gripping position (e.g. by one or more resilient members, such as springs) to return to the non-gripping position.

The gripping member and the gripping member-contacting portion may be shaped such that a portion of the gripping member distant from the portion of the gripping member that grips the inner surface of the line may contact the gripping member-contacting portion when the gripping member is in its actuated position. It may be this contact that limits the movement of the gripping member, and hence limits movement of the gripping member-contacting portion. Preferably, the gripping member and the gripping member-contacting portion are shaped such that this contact occurs over an area of the gripping member-contacting portion, rather than a point contact. This is preferably the case for the pivotable gripping member.

The crescent shape of the gripping member may be preferable as it accommodates the gripping member-contacting portion toward the centre of the first end member. The crescent shape may have slight modifications (such as bulges and recesses) on its radially inner surface to optimise its contact with the gripping member-contacting portion (preferably when in the gripping position).

When a plurality of gripping members are present, the gripping members and the gripping member-contacting portion may be configured such that the gripping member-contacting portion actuates each of the gripping members in a similar/identical manner at similar/identical times. This may occur due to the above-discussed symmetry of the first end assembly. The gripping member-contacting portion may also have such symmetry. For example, when two gripping members are present, the elongated portion may have 180° rotational symmetry.

The actuator may comprise a portion proximate the second end of the seal that is configured such that torque may be applied to the actuator in a straightforward manner. For instance, this portion may be an end portion of the actuator and may comprise a torque transmission bar, such as a T-bar. The torque transmission bar may be oriented perpendicular to the longitudinal direction and may have a length less than or equal to the width of the plug. The torque transmission bar may be conveniently gripped and rotated by a user/tool.

At the second end of the seal, the actuator may also comprise a torque transmitter, which may be generally cylindrical and hollow with an open end facing away from seal and a generally closed end facing toward the seal. The generally closed end may comprise a bore through which the elongated actuator member may pass. The outer surface of the generally closed end may abut the second end assembly, preferably via a washer.

The torque transmitter may comprise two bore holes, extending radially through the walls of the torque transmitter at 180° to each other. These holes may accept the torque transmission bar. These holes may be located near the open end of the torque transmitter.

On the inner side of the generally closed end, there may be a socket that accepts and cooperates with a head (such as a bolt head) of the elongated actuator member. This arrangement advantageously allows for the threaded elongated member to be easily replaceable within the plug, so that different lengths of elongate members can be used for different lengths of seals, as appropriate. This is especially the case where the elongate member is simply a commercially available bolt, as many different standard lengths of bolts are commercially available. In order for the radially extending portions of the torque bar not to extend beyond the diameter of the plug as a whole, the radius of the torque transmitter may be substantially smaller than the radius of the plug (e.g. at least two thirds, or at least one half).

The first end assembly may comprise a raised member having a width greater than the width of the seal or remainder of the plug. The raised member may be configured to cooperate with the inner surface of the line to provide the first end assembly with some initial resistance to movement during the initial part of the motion of the actuator.

The width of the seal/plug here is meant to the width in a direction perpendicular to the longitudinal axis. For example, when the plug/seal is cylindrical, the width may be the diameter. The width of the raised member may be greater by at least 1-10 mm, preferably 3-8 mm, preferably 6 mm.

As may be appreciated, if the first end assembly were to move with the actuator, then the gripping member would move with the actuator, and so the gripping member would not be actuated. Thus, it is the relative movement of the actuator and the first end assembly that allows the actuator to actuate the gripping member (or more precisely the relative movement of the gripping member-contacting portion and the gripping member). Thus, the first end assembly may need to resist moving with the actuator when the actuator is moved. For instance, when the first end assembly and the actuator are in threaded contact, there may be some friction in the threads that would tend to make the first end assembly rotate with the actuator. Of course, the first end assembly's motion is resisted/inhibited once the gripping member makes contact with the line or when the first end assembly is compressed against the seal. However, before either of these events occurs, there may be a need to provide some other form of motion resistance/inhibition. The inventors have found that including the raised member in the first end assembly may provide such an initial motion resistance. The raised member may contact the inner surface of the line to provide this resistance.

The contact between the raised portion and the line may be achieved by the raised portion having a similar diameter to the plug, or if the raised portion has a smaller diameter than the plug, angling the plug relative to the line so that there is a point of contact.

However, it should be noted that the plug may still work without the raised portion, as initial motion resistance can be achieved by friction between the first end assembly (without the raised portion) and the line, e.g. by angling the plug so that there is a point of contact between the first end assembly and the line.

Preferably, the raised member comprises a resilient material. Due to its resilient nature, the raised member may not prevent the plug from being inserted into the line, and the friction between the raised member and the line may be increased. Further preferably the resilient material may be rubber.

The raised member may comprise a plurality of blades extending generally radially from the remainder of the raised member. The blades may extend generally in the longitudinal direction.

In another aspect, the invention provides a method of installing a plug inside a line, the plug comprising: a seal; a first end assembly located at a first end of the seal and a second end assembly located at an opposite second end of the seal, the first end assembly comprising at least one gripping member that is configured to grip an inner surface of the line; and an actuator configured to draw the first and second end assemblies together when there is a relative motion between the actuator and the first end assembly and to actuate the gripping member, the method comprising: moving the actuator with an initial part of a motion that actuates the gripping member to grip the inner surface of the line, thus inhibiting motion of the first end assembly, and further moving the actuator with a subsequent part of the motion, relative to the thus motion-inhibited first end assembly, to draw the second end assembly toward the first end assembly, thus compressing the seal, thus sealing the seal against the inner surface of the line, thus plugging the line.

The motion may be a first motion, such as a motion in a first direction. The method may comprise: moving the actuator with a second motion thus moving the first and second end assemblies away from each other so as to decompress the seal, and causing the gripping member to release the inner surface of the line.

This may be done in any order, but preferably an initial part of the second motion causes the gripping means to release the inner surface of the line. A subsequent part of the second motion may then cause the movement of the first and second end assemblies away from each other. The initial second motion may also have caused some movement of the first and second end assemblies away from each other.

The method may comprise installing the plug inside a lateral side line pipe to a well. The lateral side line pipe may be to a well head, and may be a generally horizontal line, and may be a generally circular cross-section. The line may lead to an annulus within the well. The line may be at substantially the same pressure as the annulus. The plug may be installed so as to seal the annulus from an outer portion of the line pipe, which may be open to atmospheric pressure, or at least a lower pressure. This may allow the outer portion of the line pipe (and any other components outside of the plug) to be worked on at atmospheric pressure, or indeed removed, whilst maintaining the pressure and fluids in the annulus.

Preferably the tool used to install the plug may provide a sealed environment in the vicinity of the plug, which may prevent pressurised fluid in the line in the vicinity of the plug from leaking out of the line via the tool.

The method and/or plug may comprise any of the features discussed above in relation to the plug.

BRIEF DESCRIPTION OF THE DRAWINGS

Preferred embodiments will now be described by way of example only with reference to the accompanying drawings in which.

DETAILED DESCRIPTION

Figure 1:
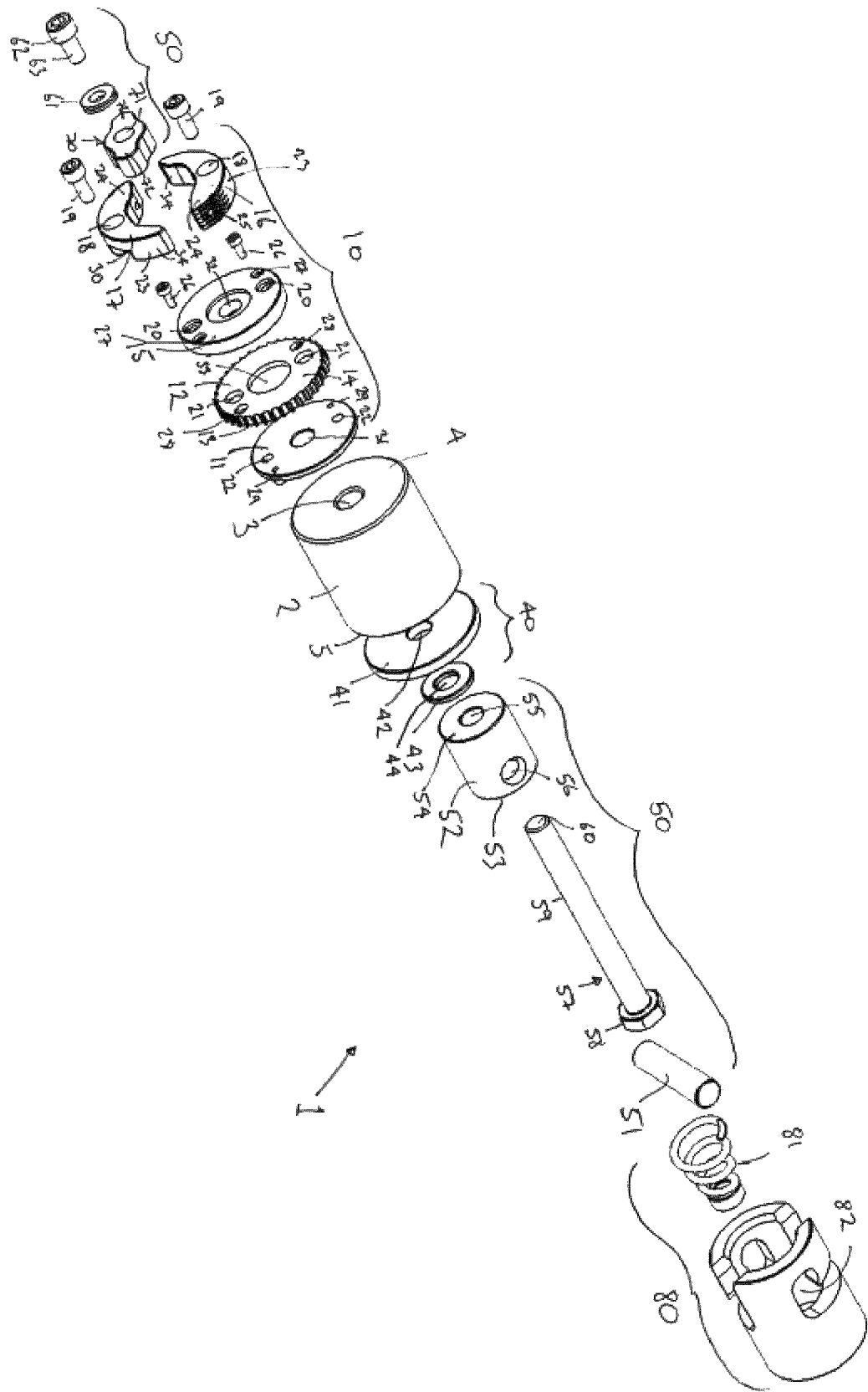
FIG. 1 shows an exploded view of a plug according an embodiment of the invention.
Figure 2:
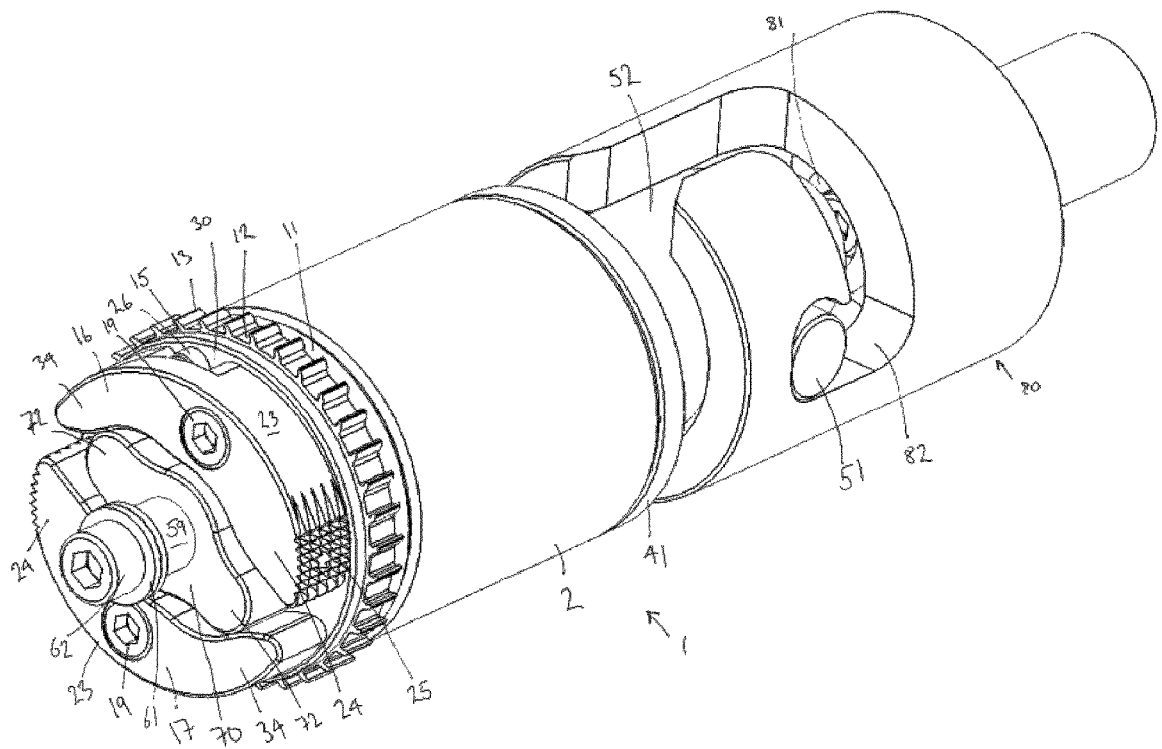
FIG. 2 shows a perspective view of the plug in its relaxed state.

FIG. 1 shows an exploded view of a plug 1 and FIG. 2 shows a perspective view of the plug 1. The plug 1 comprises a cylindrical seal 2 with a central bore 3 extending in a longitudinal direction through the centre of the seal 2 from a first end 4 to a second end 5 of the seal. The seal 2 is made from a resilient material, such as rubber, such as polyurethane rubber. The central bore 3 is sized so that the actuator 50 can pass through it. The seal 2 may have a relaxed length of between 30 to 200 mm. The seal 2 may have a compressed length of between 25-180 mm. The diameter of the seal 2 when relaxed may be between 30-55 mm. The diameter of the seal 2 when compressed may be between 32-61 mm. The diameter of the remainder of the plug 1 may be between 30-55 mm. The length of the plug 1 (i.e. including the first end assembly, the second assembly, the seal and the actuator) may be between 90 and 270 mm.

Adjacent and in contact with the first end 4 of the seal 2 is a first end assembly 10.

First end assembly 10 comprises a first end plate 11 in contact with the first end 4 of the seal 2. The first end plate 11 is made from a metal, such as stainless steel.

A resilient raised member 12 is in contact with the first end plate 11. The resilient raised member 12 has a radius greater than of the other components of the plug 1. The resilient raised member comprises blades 13 that extend generally radially from a cylindrical body 14 of the resilient raised member 12. The blades 13 also run extend generally longitudinally. The cylindrical body 14 may have a radius substantially equal to that of the other components of the plug 1. The resilient raised member 14 is made from a resilient material such as rubber, such as polyurethane rubber.

A second end plate 15 is in contact with the resilient raised portion 12, such that the resilient raised portion is sandwiched between the first 11 and second 15 plates. The second end plate 15 is made from a metal, such as stainless steel.

The first end assembly 10 also comprises a first gripping member 16 and a second gripping member 17. These gripping members 16, 17 are substantially identical to each other. Each gripping member 16, 17 is substantially crescent-shaped and comprises a countersunk bore 18 through a midpoint of the crescent. The countersunk bore 18 is designed so as to cooperate with an elongated member 19 so as to hold the gripping member 16, 17 to the remainder of the first end assembly. Specifically, the elongated member 19 is held in and passes through the countersunk bore 18. The elongated member 19 also passes through bore 20 in the second end plate 15 and bore 21 in the resilient raised member 12. The elongated member 19 may be a bolt that is threadedly attached to first end plate 11 via threaded bore 22. Alternatively, it may not be threaded and instead may be press fit into the bores. Thus, the elongated member 19 not only holds the gripping member 18 to the second end plate 15, it also is used to secure the first end assembly 10 together, and to prevent relative longitudinal and rotational movement of the different components of the first end assembly. The elongate member 19 may pass entirely through the first end assembly 10 and protrude therefrom such that the elongate members 19 may press into the first end 4 of the seal 2. This may at least partially hold the first end assembly 10 relative to the seal 2 (against relative rotation).

The elongated member 19 and the counter bore 18 are configured to allow the gripping member 16, 17 to pivot around the elongated member 19.

The elongated member 19 may preferably be made from high-tensile steel, and may preferably be a commercially available socket head bolt.

The crescent-shaped gripping members 16, 17 are arranged such that (when in the non-gripping state as shown in FIG. 2) the outer radial edges/surfaces 23 of the crescent-shaped members may form two arc portions of the same circle, said circle being concentric with the remainder of the plug 1. Thus, the two crescent-shaped gripping members 16, 17, when in the non-actuated position, may not extend beyond the radial outer extent of the plug 1 or first end assembly 10 or second end plate 15. However, when the gripping members 16, 17 pivot about the elongated member 19, an end portion 24 may extend beyond the outer periphery of the remainder of plug 1. This is explained in more detail below.

The crescent-shaped gripping members 16, 17 are also shaped/arranged so that an elongated gripping member-contacting portion 70 can be located in between the gripping members 16, 17 adjacent a radially central location of the first end assembly 10. Again, this is explained in more detail below. The gripping member-contacting portion 70 is part of the actuator 50 and rotates with the remainder of the actuator 50 when the actuator 50 rotates. Thus, the actuator 50 (through the gripping member-contacting portion 70, which is part of the actuator) directly actuates the gripping members 16, 17. There is no intermediate portion moved by the actuator 50, in a different motion to the actuator 50 (such as linear motion), which in turn actuates the gripping members 16, 17, as occurs in the prior art.

The gripping members 16, 17 also comprise a gripping surface 25. The gripping surface 25 is located on the outer radial surface 23 of the gripping members 16, 17 and is located on the end portion 24 that may extend beyond the periphery of the plug 1. The gripping surface 25 may comprise grooves and ridges extending radially and in the longitudinal direction. Preferably, grooves and ridges also extend circumferentially.

The gripping member 16, 17 may comprise a nickel-chrome alloy, hi-tensile steel alloy or tungsten carbide and the gripping surface 25 may comprise a tungsten carbide alloy.

The first end assembly 10 also comprises two stops 26. These comprise a portion that protrudes from the second end plate 15 and a portion that extends through a bore 27 in the second end plate 15, extends through a bore 28 in the raised resilient member 12 and engages with bore 29 in the first end plate 11. The stop 26 may be attached to the first end assembly 10 via threads or via a press fit. Thus, the stop 26 also acts to secure the first end assembly 10 together, preventing relative longitudinal and rotational movement of the first end plate 11, the resilient raised member 12 and the second end plate 15.

The stops 26 may pass entirely through the first end assembly 10 and protrude therefrom such that the stops 26 press into the first end 4 of the seal 2. This may at least partially hold the first end assembly 10 relative to the seal 2 (against relative rotation).

The stop 26 thus protrudes from the second end plate 15. The gripping member 16, 17 comprises a channel 30 through which the stop 26 may pass when the gripping member pivots. The channel 30 extends from an opening in the outer radial edge/surface 23 into a central portion of the gripping member 16, 17 and comprises an end portion within the central portion. The pivoting of the gripping member 16, 17 may be limited by contact between the end portion of the channel 30 and the stop 26, as is discussed further below.

The first end assembly 10 is generally cylindrical and is generally concentric with the seal 2. For instance, the first end plate 11, the raised resilient member 12 and the second end plate 15 are concentric with the seal. Further, the first end assembly 10 comprises a threaded bore that may receive the actuator 50. The first end plate 11 comprises a bore 31 that may be threaded so as to cooperate with a threaded portion of the actuator 50. The second end plate 15 comprises a bore 32 that may be threaded so as to cooperate with a threaded portion of the actuator 50. Due to this threaded connection, as the actuator 50 is turned relative to the first end assembly 10, there is longitudinal relative movement between the actuator 50 and the first end assembly 10 as discussed below. The raised resilient member 12 also comprises a central bore 33.

The first end plate 11, the raised resilient member 12 and the second end plate 15 are generally disk-shaped, i.e. cylindrical. They all have substantial equal radii (except for the raised resilient member 12, which is slightly larger), which are substantially equal to the radius of the seal 2.

The first end assembly 10 has a 180° rotational symmetry about its central longitudinal axis. Thus, the two bores 20, 21, 22, 27, 28, 29 are separated by 180° from each other, and the two gripping members 16, 17 are arranged similarly separated by 180° from each other. Between the end 24 of one gripping member 16, 17 and the opposite end 34 of the other gripping member 17, 16 there may be a gap.

The plug 1 also comprises a second end assembly 40 adjacent to and in contact with the second end 5 of the seal 2.

The second end assembly 40 comprises a first end plate 41 in contact with the second end 5 of the seal 2. The first end plate 41 is made from a metal, such as stainless steel. The first end plate 41 comprises a central bore 42 through which the actuator 50 passes. This bore 42 is not threaded to the actuator 50. Thus, the actuator 50 may rotate relative to the first end plate 41 without causing any relative longitudinal motion therebetween.

A washer 43 is provided adjacent to and in contact with the first end plate 41. This washer is preferably made of bronze, such as high tensile bronze (such as AMPCO M4 Bronze or similar), which prevents lugging. The washer 43 comprises a central bore 44 through which the actuator 50 may pass. Again, there is no threaded connection between bore 44 and the actuator 50 so that the actuator 50 may rotate relative to the washer 44 without causing any relative longitudinal motion therebetween. The washer 43 is provided between the first end plate 41 (which is generally held stationary by friction with the seal 2) and the actuator 50 (which rotates), so as to allow the rotation of the actuator 50 relative to the first end plate 41.

The first end plate 41 and the washer 43 are disk shaped (e.g. cylindrical). The first end plate 41 has a radius substantially similar to that of the seal 2. The washer has a radius substantially smaller than the seal 2. The first end plate 41 and the washer 43 are concentric with the seal 2, and the first end assembly 10.

The plug 1 also comprises an actuator 50. Proximate the second end 5 of the seal 2, the actuator 50 comprises a radially extending torque bar 51 and a torque transmitter 52. The torque transmitter 52 is generally cylindrical and hollow with an open end 53 facing away from seal 2 and a generally closed end 54 facing toward the seal 2. The generally closed end 54 comprises a bore 55 through which the elongated actuator member 57 passes. The outer surface of the generally closed end 54 abuts the washer 44.

In the torque transmitter 52 comprises two bore holes 56 extending radially through the walls of the torque transmitter 56 at 180° to each other. These holes 56 accept the torque bar 51. These holes 56 are located near the open end 53.

On the inner side of the generally closed end 54 (i.e. the side of the closed end 54 further from seal 2), there is a socket (not shown) that accepts and cooperates with the bolt head 58, in a manner similar to how a spanner or wrench socket accepts a bolt head.

The actuator 50 also comprises a bolt 57 (the elongated actuator member) that comprises a threaded elongated shaft 59 and a bolt head 58. The bolt 57 may preferably be a standard bolt. The bolt 57 may be comprised of metal, such as stainless steel. Preferably the bolt 57 is a commercially available bolt 57 with threads matching the threads of the bore 71 and the threads of the first end assembly 10. The threads on the bolt 57 may extend along substantially the entirety of the length of the bolt 57, or may only extend over a length in the region of the first end assembly 10 and nut 70.

Thus, when bolt 58 is inserted into the torque transmitter 52, the bolt head 58 engages with the socket, locking the bolt head 58 to the torque transmitter 52 in the rotational direction. The torque bar 51 may then be inserted through the holes 56 such that the torque bar extends radially outward from the torque transmitter 52. The torque bar 51 may be secured by a press-fit to the holes 56. It is these radially extending portions of the torque bar 51 that torque may be applied to by a user/tool.

Due to this simple design, the overall length of the plug 1 may straightforwardly be adjusted to suit a specific situation by replacing the bolt 57 and the seal 2 with another bolt 57 and seal 2 of different length.

In order for the radially extending portions of the torque bar 51 to not extend beyond the diameter of the plug 1 as a whole, the radius of the torque transmitter 52 may be substantially smaller than the radius of the plug 1 (e.g. at least two thirds, or at least one half).

The elongated threaded shaft 59 of the bolt 57 pass through the bore holes 55, 44, 42, 3, 31, 33, 32 and emerges in between the gripping members 16, 17. The bolt 57 is in threaded contact with the first end assembly 10 (via bore hole 31 and/or 32).

At the first end 4 of the seal 2 the actuator 50 also comprises an elongated nut 70 which comprises a threaded bore 71 that connects to the threads on the shaft 59 of the bolt 57 in the vicinity adjacent to the first end assembly 10, preferably in the space in between the two gripping members 16, 17.

The actuator 50 comprises a washer 61 that is placed between the end of bolt 57 and an end bolt 62. The end bolt 62 comprises a threaded portion 63 that threads into internal threads 60 in the bolt. Thus, the end bolt 62 and the bolt 57 clamp the washer 61 in place. Since the washer has a diameter greater than that of the bolt 57, the washer 61 acts as a stop when it contacts the elongated nut 70, so as to prevent the bolt being fully unscrewed from the elongated nut 70 and the first end assembly 10.

The elongated nut 70 is elongated in a direction perpendicular to the longitudinal direction (i.e. in the radial direction). The elongated nut 70 may comprise two elongated end portions 72 that are used to contact the gripping members 16, 17 to actuate the gripping members 16, 17 as is discussed in more detail below.

A tool head 80 may be provided to provide torque to the plug 1. The tool head 80 may comprise a spring 81 and a gripping slot 82 that are used to releasable grip the torque bar 51. The tool head 80 may be connected to a motor or any torque-providing means, such as a manual spanner/wrench. The tool head 80 is cylindrical with a diameter less than or equal to the diameter of the plug (in its relaxed state). The tool head may be generally hollow so that its inner radial surface can cooperate with the outer radial surface of the torque transmitter 52.

Below, the function of the plug 1 is set out.

Figure 3:
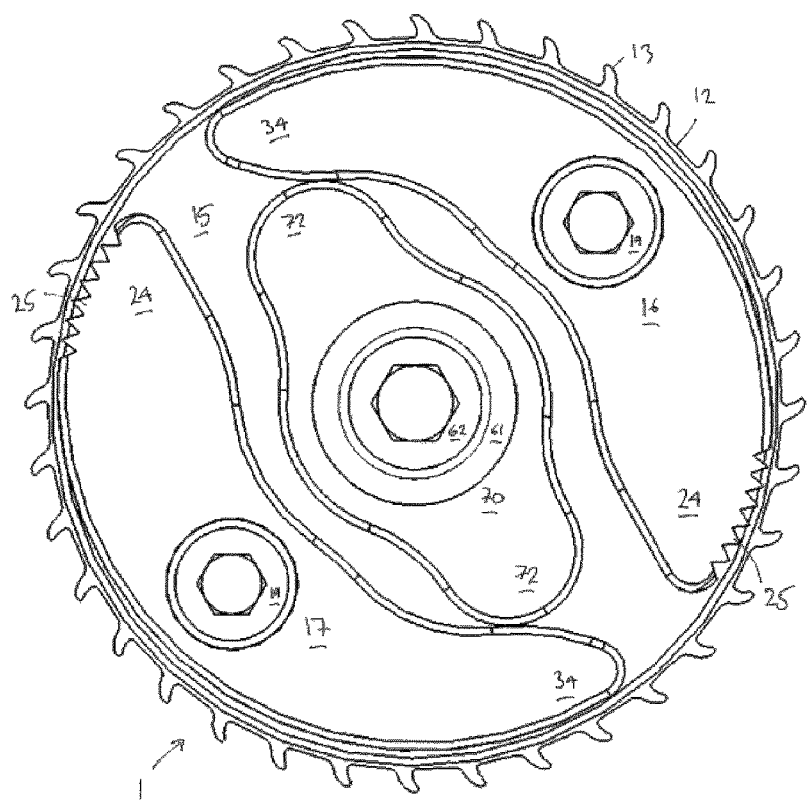
FIG. 3 shows an end view of the plug in its relaxed state.

Regarding FIGS. 2 and 3, the plug 1 is shown in a non-actuated relaxed state. In this state, the plug 1 the entirety of the plug 1 has radius substantially equal to the radius of the non-compressed seal 2, except for the resilient raised portion 12 which has a slightly greater radius so that its blades 13 protrude radially.

The gripping members 16, 17 are thus within the profile of the plug 1, and are held in position by elongated nut 70. The elongated nut 70 is in contact with ends 34 of the gripping members and holds the gripping members 16, 17 against the stops 26. The outer edges of the gripping members 23 follow arc sections of the same circle in this non-actuated state.

In the non-actuated state, the plug 1 may be inserted inside a line 101. The diameter of the line 101 may be slightly larger than that of the plug 1 or seal 2. The insertion of the plug may be carried out via a tool connected to the plug 1 via cooperation between the torque bar 51 and the torque transmitter 52 of the actuator 50 and the spring 81 and hollow tool head 80.

Figure 6:
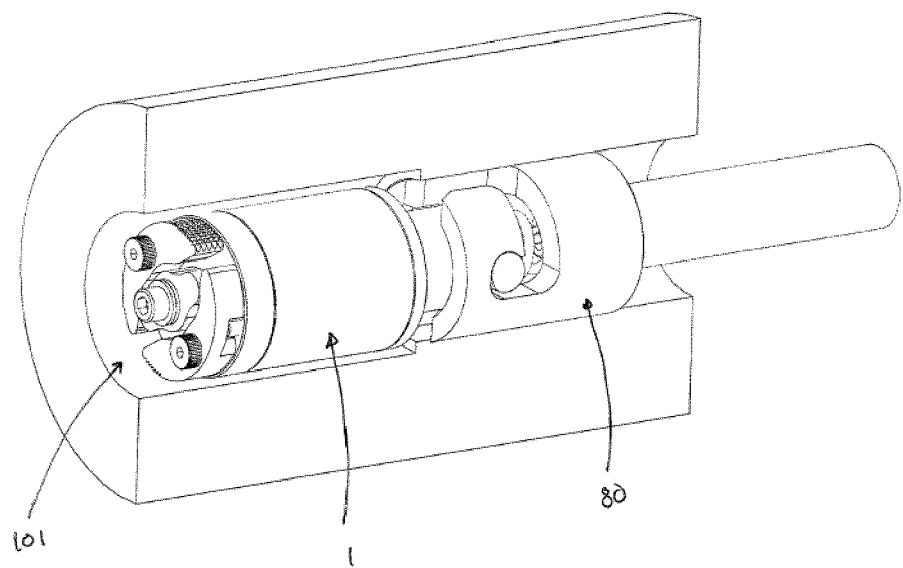
FIGS. 6-9 show a method of installing the plug.

Once in the correct position relative to the line 101, the insertion of the plug can be ceased (see FIG. 6). The tool head 80 provides clockwise torque (clockwise when looking from the tool head 80 toward the plug 1). This provides a clockwise torque to the torque bar 51, which is transmitted the clockwise torque 51 to the torque transmitter, which transmits the torque (via the socket and bolt head 58) the bolt 57.

Due to friction between the bolt 57 and first end assembly 10 (e.g. via threads), this torque may also be transmitted to the first end assembly 10. To ensure that this torque rotates the bolt 57 relative to the first end assembly, the resilient raised portion 12 is provided. The resilient raised portion 12 contacts the inner surface of the line 101 and initially resists rotation of the first end assembly 10 (which may otherwise have been caused by the torque) due to friction between the resilient raised portion 12 and the inner surface of the line 101.

This allows the bolt 57 to turn relative to the first end assembly 10. Due to friction between the threads of the elongated nut 70 and the bolt 57 and between the washer 61 and the elongated nut 70, this causes rotation of the elongated nut relative to the gripping members 16, 17. Thus, the torque may be transferred from the bolt 57 to the elongated nut via friction in the threads and/or via washer 61. This rotation would be anti-clockwise in FIG. 3.

Figure 4:
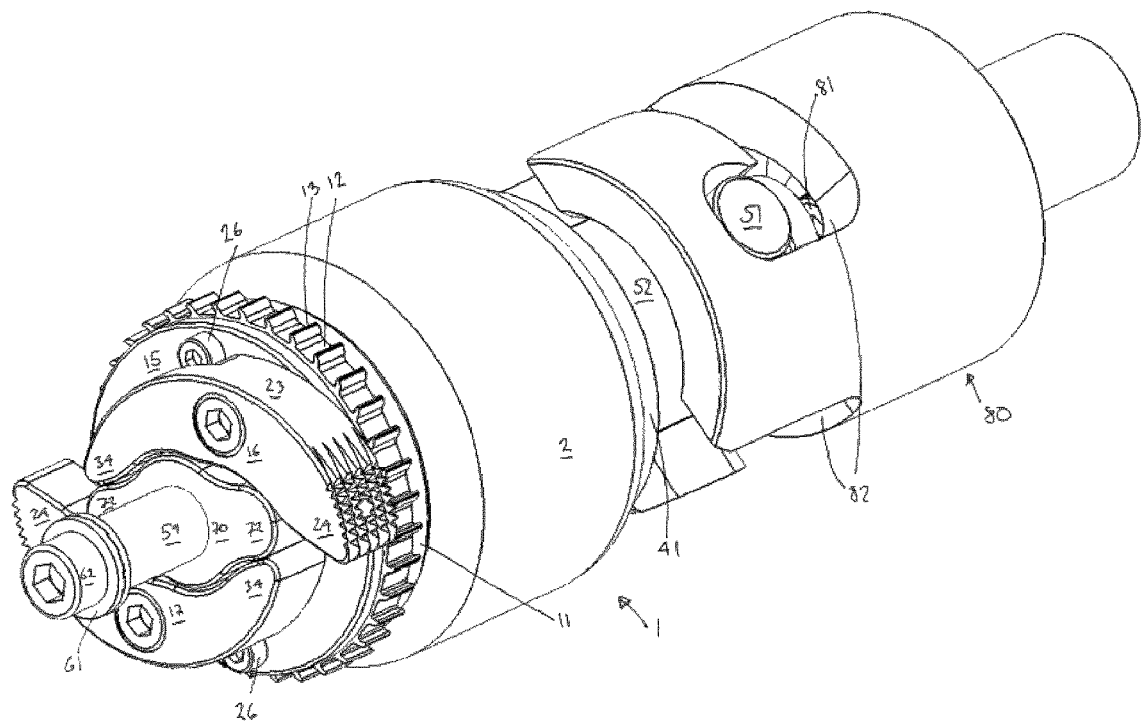
FIG. 4 shows a perspective view of the plug in its compressed state.
Figure 5:
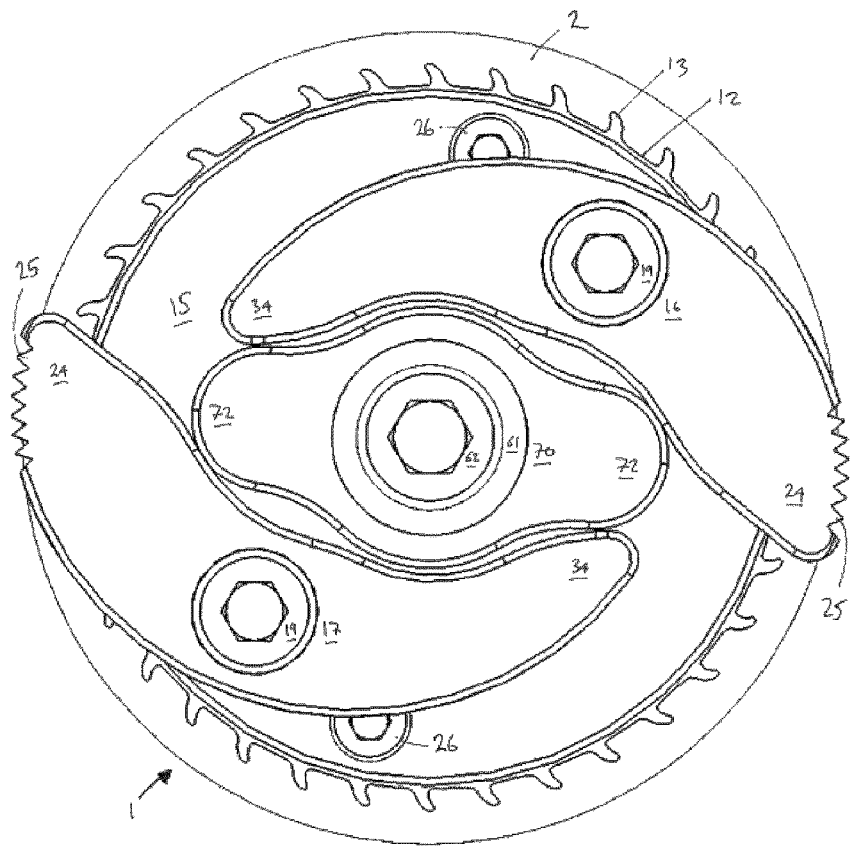
FIG. 5 shows an end view of the plug in its compressed state.
Figure 7:
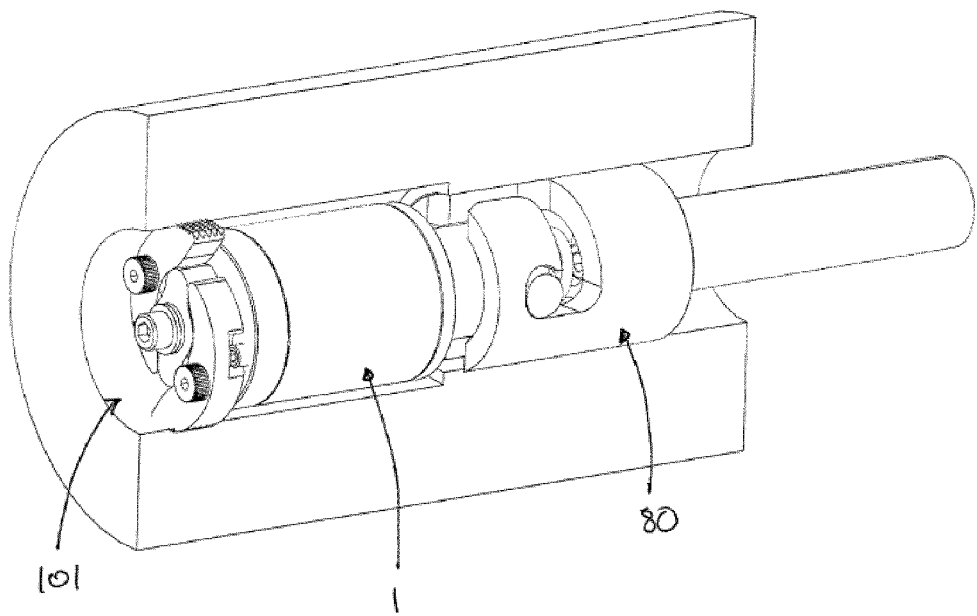

As can be seen from FIGS. 4 and 5, when the elongated nut 70 rotates in this manner, it contacts ends 24 of the gripping members 16, 17 causing them to pivot about elongated member 19. Continued rotation of the elongated nut 70 causes ends 24 of the gripping members 16, 17 to protrude beyond the periphery of the remainder of the plug and causes the gripping surfaces 25 to grip the inside of the line, as can be seen in FIG. 7.

The movement of the gripping members 16, 17 is limited either by the contact between the gripping members 16, 17 and the inside wall of the line 101, or by contact between the other end 34 of the gripping members 16, 17 with the other end 72 of the elongate members.

Once the gripping members 16, 17 reach the limit of their movement, they stop pivoting. This in turn stops the rotation of elongated nut 70. The actuated gripping members 16, 17 grip the inside of the line 101 and inhibit the rotation of the first end assembly.

Figure 8:
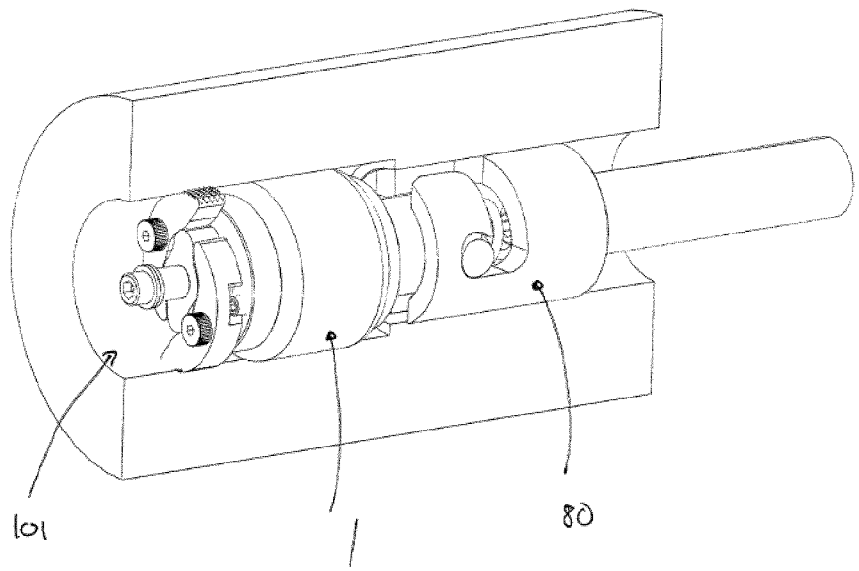

With continued rotation of the tool 80, the bolt 57 continues to rotate. Since the first end assembly 10 is held, the elongated nut 70 is also held. Thus, the bolt 57 rotates relative to both the first end assembly 10 and the elongated nut 70. Due to the threaded connection of the first end assembly 10 and the bolt 57, this relative rotation draws the first end assembly 10 toward the second end assembly 40, thus compressing the seal 2 and expanding the seal's radius such that it causes the seal to plug the line 101 as can be seen in FIGS. 4, 5 and 8. Also, due to the threaded connection of the elongated nut 70 and the bolt 57, this relative rotation keeps the elongated nut 70 adjacent the first end assembly.

Figure 9:
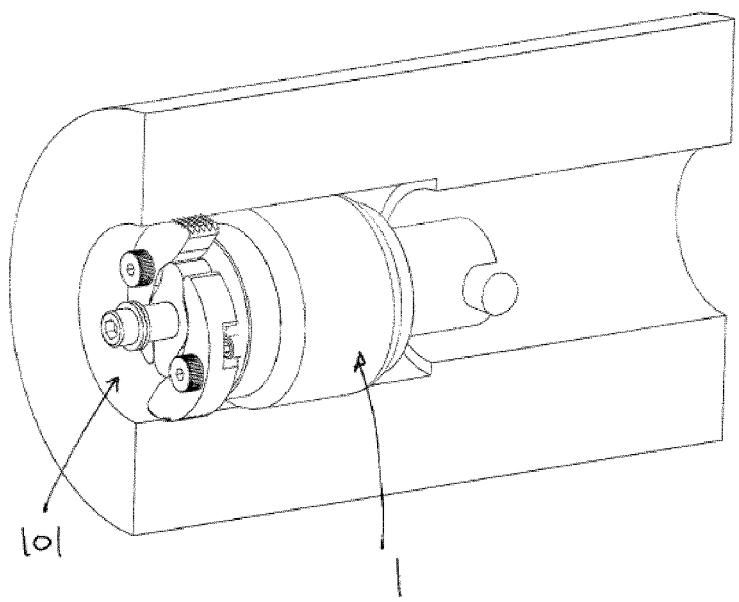

The tool 80 may then be removed and the plug 1 remains inside the line 101 plugging the line 101, as can be seen in FIG. 9.

In order to retrieve the plug 1, essentially the opposite process is done. Thus, the tool 80 is inserted into the line and contacts/grips the torque bar 51. The tool 80 then applies torque in the opposite direction (e.g. anticlockwise). This causes the bolt 57 to move the second end assembly 40 away from the still held first end assembly 10, thus allowing the seal 2 to expand in the longitudinal direction and to shrink in the radial direction so that the seal is broken.

Once the seal has returned to its natural state (or has nearly returned to its natural state), the first end assembly 10 is released from the inner surface of the line 101. This is done by further rotation of bolt 57 anticlockwise. This further rotation (preferably when the washer 61 contacts the elongated nut 72) causes the elongated nut 72 to rotate in the opposite direction to the actuating direction (clockwise in FIGS. 3 and 5). The torque may be transferred from the bolt 57 to the elongated nut via friction in the threads and/or via washer 61.

This rotation causes the ends of elongated nut 72 to push against ends 34 of the gripping members 16, 17, which causes the gripping members to pivot back to the non-actuated position (shown in FIGS. 2 and 3). The gripping members 16, 17 come to rest against respective stops 26, which limit their movement in this direction.

Thus, in this way, the plug 1 is detached from the line 101. The plug 1 is then removed from the line using the tool 80.

Figure 10:
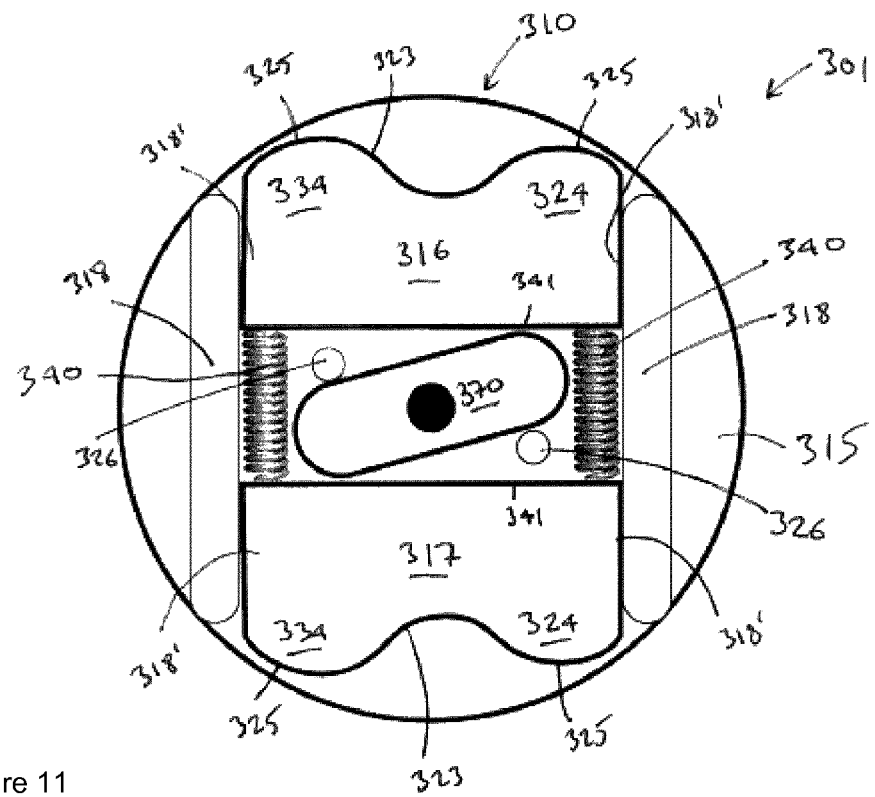
FIGS. 10 and 11 show an alternative embodiment of the plug.
Figure 11:
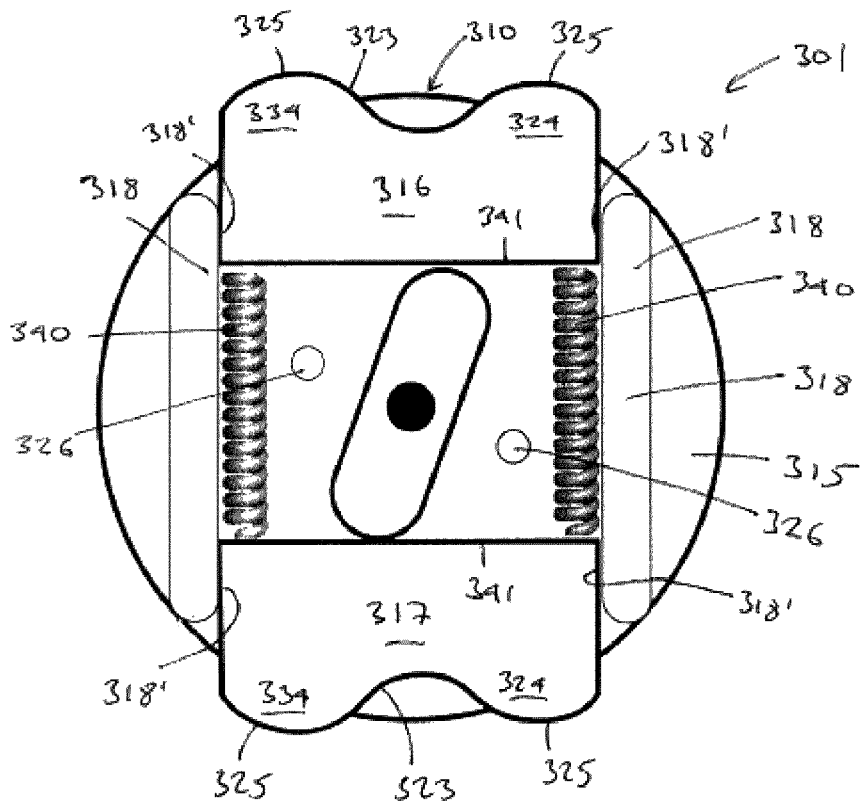
Figure 12:
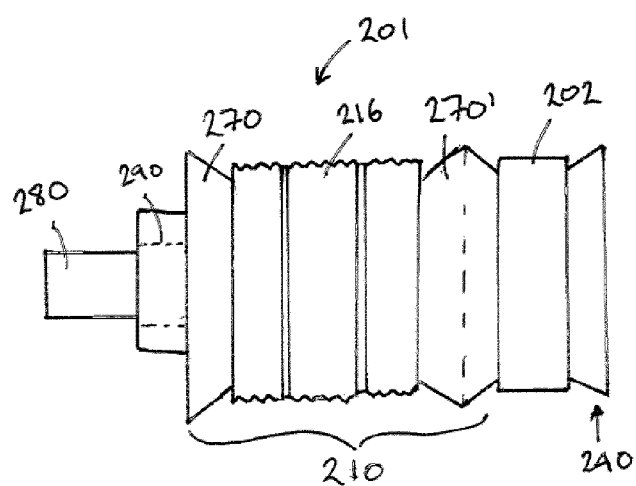
FIGS. 12 and 13 show a side view of an exemplary prior art plug.
Figure 13:
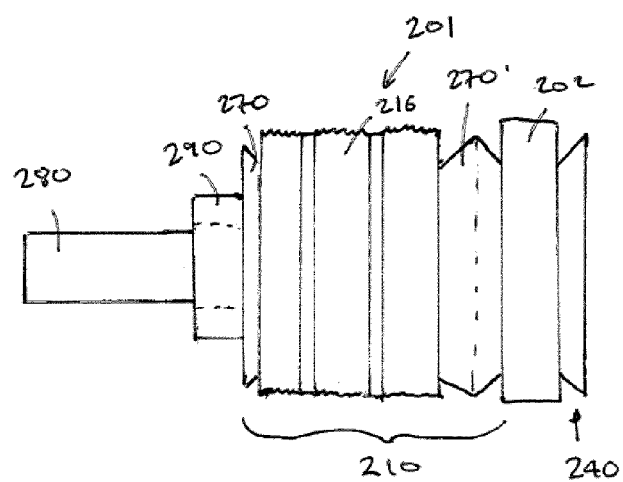

Regarding FIGS. 10 and 11, and alternative embodiment of the plug 301 is shown. All details of this plug 301 may be the same as plug 1, except where discussed below.

Thus, shown is the first end assembly 310, comprising a first gripping member 316 and a second gripping member 317. These gripping members 316, 317 are substantially identical to each other. Each gripping member 316, 317 is substantially B-shaped (i.e. comprises two bulges at opposite ends 324, 334) and comprises a means 318 for retaining the gripping member 316, 317 to the remainder of the first end assembly 310. This means may comprise a guide that extends in the direction of sliding, preferably two such guides, preferably along a segment of the circle defined by the periphery of the plug 301. There are preferably two such guides extending parallel with one another, and holding the gripping members 316, 317 inbetween. The gripping member 316, 317 may have edge portion(s) 318' extending parallel with the guides 318, preferably at each end 324, 334 of the gripping member 316, 317. These edge portions 318' may be configured to cooperate with the guides 318 to allow the gripping member 316, 317 to slide relative to and along the guides 318 and to retain the gripping member 316, 317 adjacent the first end assembly 310 (e.g. via a tongue and groove arrangement).

The guide 318 and the gripping member 316, 317 are configured to allow the gripping member 16, 17 to slide along the guide 318.

The guide 318 may be made integral with the second end plate 315 or may be attached thereto. The guide may be stainless steel, preferably high tensile stainless steel.

The B-shaped gripping members 316, 317 are arranged such that (when in the non-gripping state as shown in FIG. 10) the outer radial edges/surfaces 323 of the B-shaped gripping members 316, 317 do not extend beyond the radial outer extent of the plug 301 or first end assembly 310 or second end plate 315. However, when the gripping members 316, 317 slide along the guides 318, the end portions 324, 325 (e.g. the bulge portions of the B-shaped) may extend beyond the outer periphery of the remainder of plug 301. This is explained in more detail below.

The gripping members 316, 317 are also shaped/arranged so that an elongated gripping member-contacting portion 370 can be located in between the gripping members 316, 317 adjacent a radially central location of the first end assembly 310. Again, this is explained in more detail below. The gripping member-contacting portion 370 is part of the actuator 50 and rotates with the remainder of the actuator 50 when the actuator 50 rotates. Thus, the actuator 50 (through the gripping member-contacting portion 370, which is part of the actuator) directly actuates the gripping members 316, 317. There is no intermediate portion actuated by the actuator 50, in a different motion to the actuator 50 (such as linear motion), which in turn actuates the gripping members 316, 317, as occurs in the prior art.

The gripping members 316, 317 also comprise a gripping surface 325. The gripping surface 325 is located on the outer radial surface 323 of the gripping members 316, 317 and is located on the end portions 324 and 325 that may extend beyond the periphery of the plug 301. The gripping surface 325 may comprise grooves and ridges extending radially and in the longitudinal direction. Preferably, grooves and ridges also extend circumferentially.

The gripping member 316, 317 may comprise a nickel-chrome alloy, hi-tensile steel alloy or tungsten carbide and the gripping surface 325 may comprise a tungsten carbide alloy.

The first end assembly 310 also comprises two stops 326. These comprise a portion that protrudes from the second end plate 315. The stop 326 may be fastened to the first end assembly 310, and may function, similarly to how the stop 26 is fastened to the first end assembly 10, and functions.

The rotation of the elongated nut 370 in the second rotation direction may be limited by the stops 26.

Below, the function of the plug 301 is set out.

Regarding FIG. 10, the plug 301 is shown in a non-actuated relaxed state. In this state, the entirety of the plug 301 has a radius substantially equal to the radius of the non-compressed seal, except possible for the resilient raised portion (not shown).

The gripping members 316, 317 are thus within the profile of the plug 301, and are held in position by elongated nut resilient members 340 (e.g. springs) that are attached between the two gripping members 316, 317 thus urging them toward each other and hence toward the centre of the plug 301. The elongated nut 370 is in contact with the gripping members 316, 317 and holds the gripping members 316, 317 in position (against the urging of the resilient members 340) due to stops 326.

Anticlockwise rotation of the bolt 357 (as viewed in FIG. 10 at least), due to friction between the elongated nut 370 and the bolt 357 and washer (not shown), this causes rotation of the elongated nut 357 relative to the gripping members 316, 317. Thus, the torque may be transferred from the bolt 357 to the elongated nut 370 via friction.

As can be seen from FIG. 11, when the elongated nut 370 rotates in this manner, it contacts radial inner edges 341 of the gripping members 316, 317 causing them to slide along guides 318, against the urging of the resilient members 340. Continued rotation of the elongated nut 370 causes ends 324, 325 of the gripping members 316, 317 to protrude beyond the periphery of the remainder of the plug and causes the gripping surfaces 325 to grip the inside of the line.

The movement of the gripping members 316, 317 is limited either by the contact between the gripping members 316, 317 and the inside wall of the line 101, or by extension of the resilient members 340 overcoming the friction force between the nut 370 and the bolt 357.

Once the gripping members 316, 317 reach the limit of their movement, they stop sliding. This in turn stops the rotation of elongated nut 370. The actuated gripping members 316, 317 grip the inside of the line 101 and inhibit the rotation of the first end assembly.

With continued rotation of the bolt 357 relative to the elongated nut 370, the plug 301 may plug the line.

In order to retrieve the plug 301, essentially the opposite process is done. Thus, once the seal has returned to its natural state (or has nearly returned to its natural state), the first end assembly 310 is released from the inner surface of the line 101. This is done by further rotation of bolt 357 (clockwise in FIGS. 10 and 11). This rotation causes the elongated nut 370 to rotate in the opposite direction to the actuating direction (clockwise in FIGS. 10 and 11). The torque may be transferred from the bolt 357 to the elongated nut via friction.

This rotation causes the ends of elongated nut 370 to turn anticlockwise, which in turn allows the resilient members (340) to urge the gripping members 316, 317 toward each other, toward the centre of the plug 301, and hence toward the non-gripping position. The gripping members 316, 317 come to rest when the elongated nut 370 comes to rest against the stops 326, which limit its movement in this direction.

The invention claimed is:

1. A plug for plugging a line, the plug comprising:
a seal;
a first end assembly located at a first end of the seal and a second end assembly located at an opposite second end of the seal, the first end assembly comprising at least one gripping member that is configured to grip an inner surface of the line; and
an actuator configured to draw the first and second end assemblies together when there is a relative motion between the actuator and the first end assembly,
wherein the actuator is configured to actuate the gripping member, and the plug is arranged such that:

an initial part of a motion of the actuator actuates the gripping member to grip the inner surface of the line, thus inhibiting motion of the first end assembly, and a subsequent part of the motion of the actuator, relative to the thus motion-inhibited first end assembly, draws the second end assembly toward the first end assembly so as to compress the seal such that the seal may seal against the inner surface of the line thus plugging the line, wherein the actuator comprises a gripping member-contacting portion that is located adjacent the gripping member, the plug being configured such that motion of the actuator causes rotation of the gripping member-contacting portion, which in turn causes the gripping member to be actuated; and wherein the gripping member-contacting portion comprises threads that are engaged with a threaded elongated member of the actuator.

2. A plug as claimed in claim 1, wherein the actuator is configured such that the motion of the actuator actuates the gripping member directly.

3. A plug as claimed in claim 1, wherein the motion is a first motion and the plug is arranged such that:

a second motion of the actuator moves the first and second end assemblies away from each other so as to decompress the seal, and the second motion of the actuator causes the gripping member to release the inner surface of the line.

4. A plug as claimed in claim 1, wherein the motion of the actuator is a rotation.

5. A plug as claimed in claim 1, wherein the gripping member is pivotable between its non-gripping and its gripping positions.

6. A plug as claimed in claim 1, wherein the gripping member is slidable between its non-gripping and its gripping positions.

7. A plug as claimed in claim 1, wherein the gripping member has a generally elongated shape, such as a crescent-shape.

8. A plug as claimed in claim 1, wherein the gripping member has a B-shape.

9. A plug as claimed in claim 1, wherein the gripping member is substantially incompressible and/or inelastic.

10. A plug as claimed in claim 1, wherein the first end assembly comprises at least one stop, the stop being arranged so as to limit the movement of the gripping member, and wherein the gripping member comprises a channel through which the stop is configured to pass.

11. A plug as claimed in claim 1, wherein the first end assembly comprises a plurality of gripping members.

12. A plug a claimed in claim 1, wherein the actuator comprises an elongated member that passes through the seal and the first end assembly, the elongated member comprising threads that engage threads on the first end assembly, and wherein the actuator comprises a stop attached to the end of the elongate member configured to prevent the elongate member from being withdrawn entirely from the first end assembly.

13. A plug as claimed in claim 1, wherein the actuator comprises a torque transmission bar extending generally perpendicular to the longitudinal axis of the plug proximate the second end of the seal.

14. A plug as claimed in claim 1, wherein the first end assembly comprises a raised member having a width greater than the width of the seal or remainder of the plug, the raised member being configured to cooperate with the inner surface of the line to provide the first end assembly with some initial resistance to movement during the initial part of the motion of the actuator.

15. A method of installing a plug inside a line, the plug comprising:

a seal;

a first end assembly located at a first end of the seal and a second end assembly located at an opposite second end of the seal, the first end assembly comprising at least one gripping member that is configured to grip an inner surface of the line; and an actuator configured to draw the first and second end assemblies together when there is a relative motion between the actuator and the first end assembly and to actuate the gripping member, the method comprising:

moving the actuator with an initial part of a motion that actuates the gripping member to grip the inner surface of the line, thus inhibiting motion of the first end assembly, further moving the actuator with a subsequent part of the motion, relative to the thus motion-inhibited first end assembly, to draw the second end assembly toward the first end assembly, thus compressing the seal, thus sealing the seal against the inner surface of the line, and thus plugging the line, and wherein the actuator comprises a gripping member—contactinq portion that is located adjacent the gripping member, the plug being configured such that the motion of the actuator causes rotation of the gripping member—contactinq portion, which in turn causes the gripping member to be actuated and the gripping member—contacting portion comprises threads that are engaged with a threaded elongated member of the actuator.

16. A method as claimed in claim 15, wherein the motion is a first motion, and the method comprises:

moving the actuator with a second motion, thus moving the first and second end assemblies away from each other so as to decompress the seal, and causing the gripping member to release the inner surface of the line.

17. A method as claimed in claim 15, wherein the line is a lateral side line pipe to a well.

* * * * *